US005334834A

United States Patent [19]

Ito et al.

[11] Patent Number: 5,334,834

[45] Date of Patent: Aug. 2, 1994

[54] INDUCTIVELY COUPLED PLASMA MASS SPECTROMETRY DEVICE

[75] Inventors: Tetsumasa Ito; Yoshitomo Nakagawa, both of Tokyo, Japan

[73] Assignee: Seiko Instruments Inc., Tokyo, Japan

[21] Appl. No.: 45,422

[22] Filed: Apr. 13, 1993

[30] Foreign Application Priority Data

Apr. 13, 1992 [JP] Japan ........................ 4-93032

[51] Int. Cl.[5] .................. B01D 59/44; H01J 49/00

[52] U.S. Cl. .................. 250/288; 315/111.81

[58] Field of Search .................. 250/288, 423 R; 315/111.21, 111.81

[56] References Cited

U.S. PATENT DOCUMENTS 4,629,887 12/1986 Bermier .................. 250/251

4,804,838 2/1989 Miseki .................. 250/288

5,068,534 11/1991 Bradshaw .................. 250/288

*Primary Examiner*—Bruce C. Anderson

*Attorney, Agent, or Firm*—Spensley Horn Jubas & Lubitz

[57] ABSTRACT

A structure for enabling control of the plasma potential of an ICP-MS. The structure includes: a shield plate 10 made of metal inserted between a plasma torch 1 and a high-frequency coil 2, a variable capacitor 11 connected between the shield plate 10 and ground, and an insulation member 15 is arranged to prevent contact of the high-frequency coil 2 with the shield plate 10. Even if a sample is introduced into ICP by any known method, it becomes capable to perform ICP-MS analysis while optimizing the response to interfering ions and detection sensitivity.

5 Claims, 2 Drawing Sheets

INDUCTIVELY COUPLED PLASMA MASS SPECTROMETRY DEVICE

BACKGROUND OF THE INVENTION

The invention relates to an Inductively Coupled Plasma Mass Spectrometry Device (referred to hereinafter as an ICP-MS), and in particular relates to a device of this type which makes it possible to perform element analysis under a condition where the ionization rate and the interfering ion level are optimized by controlling a plasma potential of an Inductively Coupled Plasma (referred to hereinafter as an ICP).

Relevant prior art is disclosed, for example, in "The Basis and Application for the ICP Emission Analysis" by Haraguchi, published by the Koudan-sha Scientific, pages 13 to 19 and 99 to 104. FIG. 2 shows a part of the prior art which will be compared with the present invention. The device shown in FIG. 2 includes a plasma torch 1, a high-frequency coil 2, a gas control unit 3, a sprayer 4 for producing a fine spray, a sample solution 5, a spray chamber 6, a sampling orifice 7, an analysis tube 8, and an ICP 9. The plasma torch 1 is supplied, from the gas control unit 3, with a gas (for example, argon) which forms the plasma. The sample solution 5 is mixed in sprayer 4 with the gas from the gas control unit 3, and is sprayed in the form of a mist into spray chamber 6. The droplets in the mist are classified in spray chamber 6 and droplets having a diameter equal to or less than a predetermined diameter are transferred to plasma torch 1.

High-frequency coil 2 is supplied with high-frequency electric power at 27.12 MHz (or 40 MHz) by a high-frequency power source and a matching circuit (both not shown). IPC 9 is maintained by being inductively coupled with an alternating magnetic field generated by the high-frequency electric power in coil 2.

One end of IPC 9 is arranged with the analysis tube 8 which is exhausted by a vacuum pump (not shown) having a hole of about 1 mm in diameter as a sampling orifice 7 at the tip of it. The sample solution in the form of a mist is ionized within ICP 9 and introduced into the analysis tube 8. In the analysis tube 8, the ions are mass-separated by a mass filter (for example, a quadruple mass spectrometric device, not shown), and detected by a detector (for example, a channel-tron, not shown). Infinitesimal impurity elements in the sample solution are subjected to identification and determination based on mass and intensity of the ions thus detected.

In respect to a method of introducing the sample into the ICP there are various kinds of methods such as a method of heat introduction by electrical heat and a method of supersonic atomization and the like as disclosed in "The Basis and Application for the ICP Emission Analysis" by Haraguchi, published by the Koudan-sha Scientific, at pages 61 to 72, in addition to a method of sample spraying using the sprayer as shown in FIG. 2.

In the prior art there has not yet been a means for controlling ICP plasma potentials, accordingly ICP plasma potentials have varied depending on the status of the introduced samples. ICP plasma potentials will also vary depending on the grounding position of the high-frequency coils. If the ICP has a higher plasma potential, divalent ions of the impurity element in the sample solution to be detected or constituent ions of the sampling orifice are produces as interfering ions. If the ICP has too low a plasma potential, there exist elements (elements having higher ionization potentials such as iodine, bromine, and the like) in which detecting sensitivity is lowered due to a reduction of ionization rate. Further, the plasma potential of the ICP also affects the generation of oxide ions of the impurity element to be detected and interfering ions (ArO interfering with iron, ArAr interfering with selenium, and the like) caused by solvent of the sample or the constituent gas of the plasma. In the prior art, sensitivity to the interfering ions could not be controlled because the potentials of the ICP could not be controlled.

SUMMARY OF THE INVENTION

It is an object of the present invention to provide a solution to the problem described above.

The above and other objects are achieved, according to the present invention, by an inductive coupling plasma mass spectrometric device, for identifying and determining an impurity element in a sample solution using an inductive coupling plasma, comprising a plasma torch and a high-frequency coil for maintaining the inductive coupling plasma, a gas control unit for supplying a plasma producing gas to the plasma torch, a high-frequency power source for supplying high-frequency electric power to the high-frequency coil, a matching circuit for matching the high-frequency power source to the inductive coupling plasma, and an analysis tube which detects an impurity element ionized by the inductive coupling plasma after mass separation has been performed by introducing them into vacuum, wherein the inductive coupling plasma mass spectrometric device is characterized in that a shield plate made of metal is inserted between the plasma torch and the high-frequency coil, the shield plate is connectable to ground via a variable capacitor, and the inductive coupling plasma is made controllable by arranging an insulation member between the high-frequency coil and the shield plate for preventing contact therebetween.

The ICP is maintained by an alternating magnetic field generated by the high-frequency coil, and, on the other hand, the plasma potential is determined by the alternating electric field. Therefore, in the present invention, a shield plate is inserted between the plasma torch and the high-frequency coil, the shield plate is connected to ground via a variable capacitor, and an insulative member is arranged between the high-frequency coil and the shield plate for preventing the contact therebetween, thereby making it possible to control the intensity of the alternating magnetic field within the ICP. That is, it is made to have the function in which the plasma potential can be made higher when the capacitance of the variable capacitor is given a small value and the plasma potential can be made lower when the capacitance of the variable capacitor is given a large value.

Other and further objects, features and advantages of the invention will appear more fully from the following description.

DESCRIPTION OF THE PREFERRED EMBODIMENTS

An embodiment according to the invention will be described with reference to the drawings.

Figure 1:
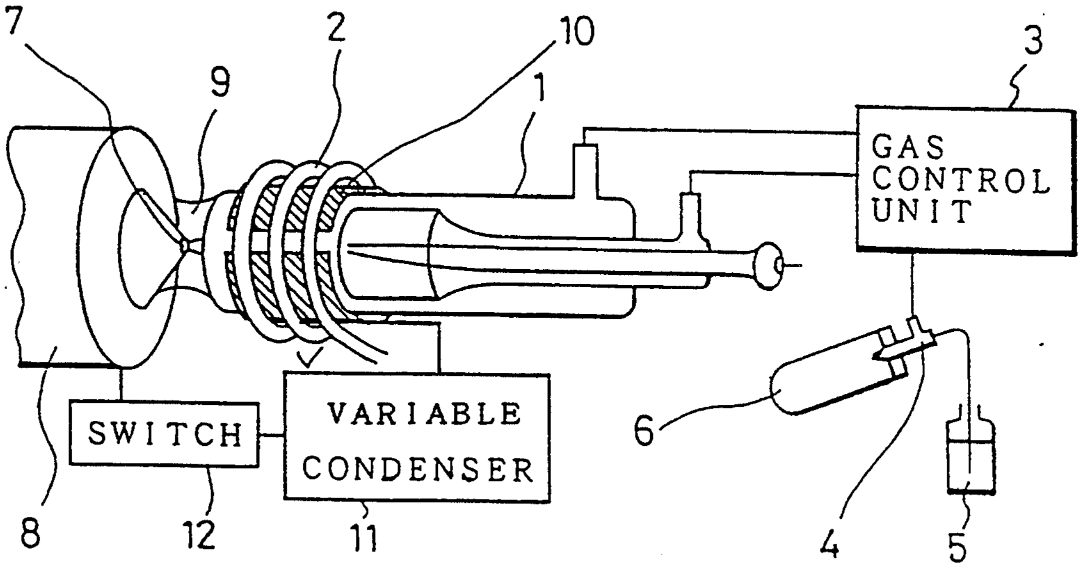
FIG. 1 is an illustrative sectional view of a device according to a preferred embodiment of the invention.
Figure 2:
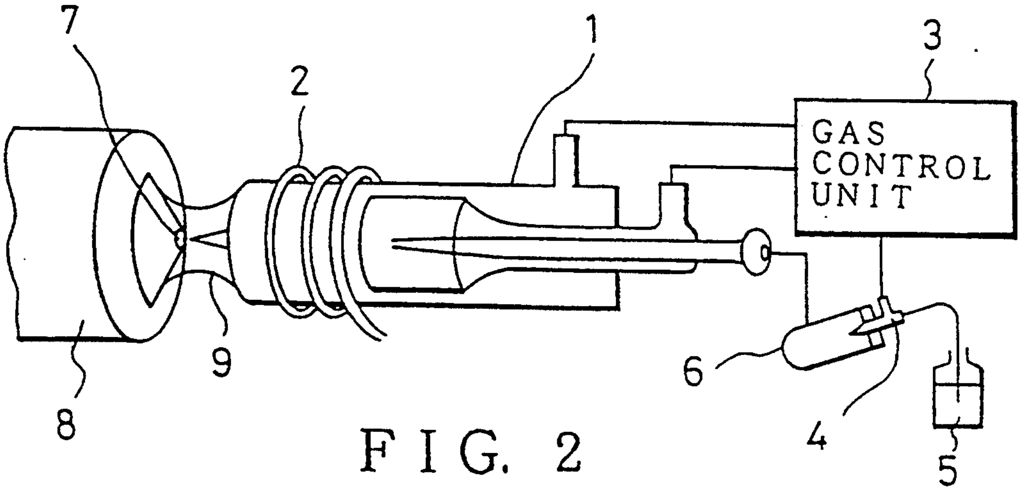
FIG. 2 is an illustrative sectional view of the prior art.

FIG. 1 is an illustrative view of the present invention, and a detailed descriptions of the parts corresponding to those of the prior art shown in FIG. 2 are omitted for plasma torch 1, high-frequency coil 2, gas control unit 3, sprayer 4, spray chamber 6, sampling orifice 7, analysis tube, and ICP 9.

According to the invention, a shield plate 10 is interposed between high-frequency coil 2 and plasma torch 1. A variable capacitor 11 is connected in series between high-frequency coil 2 and a switch 12. Switch 12 is provided to turn ON and OFF the electric connection between the variable capacitor 11 and the analysis tube 8 to be grounded. The invention is characterized by provision of the components described above.

The shield plate 10 is wrapped in the form of an open loop inside the region enclosed by high-frequency coil 2 so that an inductive current is not caused to flow around plasma torch 1 by high-frequency coil 2. The material of shield plate 10 is a non-magnetic material which does not impede passage of the alternating magnetic field generated by high-frequency coil 2; metals with good heat resistance and corrosion resistance against radiation by ICP 9, for example,, tantalum, molybdenum, titanium, platinum and the like, are suitable. The shield plate 10 is grounded via variable capacitor 11 and the switch 12. Analysis tube 8 is at ground potential in FIG. 1. When ICP 9 starts to light, a tesla coil (not shown) attached to plasma torch 1 is discharged, the instant of which requires an electric field in the high-frequency coil 2. The switch 12 has a construction and action that it is turned OFF for eliminating the electric field shielding effect of the shield plate 10 when ICP 9 starts to light, and is turned ON when ICP 9 has entered into a stationary lighting status. The variable capacitor 11 operates to control the electric field shielding efficiency of the shield plate 10 by adjustment of the capacitance of capacitor 11 during the time when the switch 12 is turned ON. It is suitable that the variable capacitance range of variable capacitor 11 is around from 0 to 200 pF.

Figure 3:
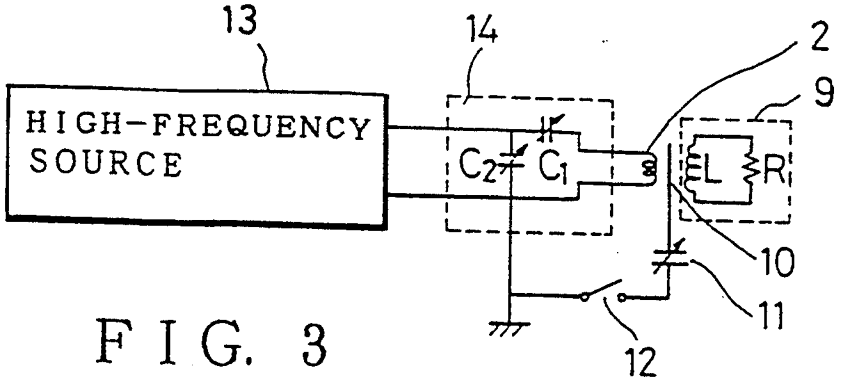
FIG. 3 is a circuit diagram further illustrating the invention.

A supplementary explanation will be given for an operation of the invention referring to FIG. 3. FIG. 3 is an equivalent circuit diagram from a high-frequency power source to the ICP. In FIG. 3, numeral 13 depicts a high-frequency power source, 14 a matching circuit, and 9 an equivalent circuit of the ICP 9 . The high-frequency electric Dower (approximately, from 0.4 to 2 kW, and 27.12 or 40 MHz) generated by the high-frequency power source 13 is supplied to the high-frequency coil 2 through the matching circuit 14 formed of two capacitors C1 (approximately from 50 to 200 pF) and C2 (approximately from 400 to 1000 pF) for achieving impedance matching with ICP 9. On the other hand, ICP 9 is represented equivalently by L (inductance) and R (resistor) as shown in FIG. 3. Accordingly, the plasma potential of ICP 9 is determined by the peripheral potential of ICP 9 and the L and R (these vary with the status of the sample introduced into the plasma torch) of ICP 9. A potential is induced in shield plate 10, disposed at the periphery of the ICP 9, by the alternating electric field formed by the high-frequency coil 2 when the switch 12 turns OFF, but the extent of which is controlled by variable capacitor 11. Thus, the plasma potential of ICP 9 is controlled.

In FIG. 1, the high-frequency coil 2 and the shield plate 10 must not be in contact with one another. Thereby, an insulation member for preventing such contact should be provided between the high-frequency coil 2 and the shield plate 10. Embodiments of arrangements with such an insulation member are shown in FIGS. 4(*a*), 4(*b*), and 4(*c*).

Figure 4A:
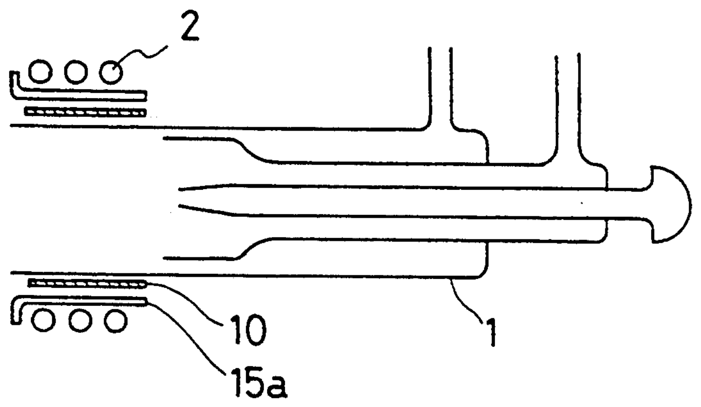
FIG. 4*a* is sectional view showing an arrangement of an insulating member according to an embodiment of the invention.

In FIG. 4*a*, a cylindrical shaped insulation member 15*a* is inserted between the high-frequency coil 2 and the shield plate 10. It is preferable that the insulation member 15*a* is made, for example, of quartz glass.

Figure 4B:
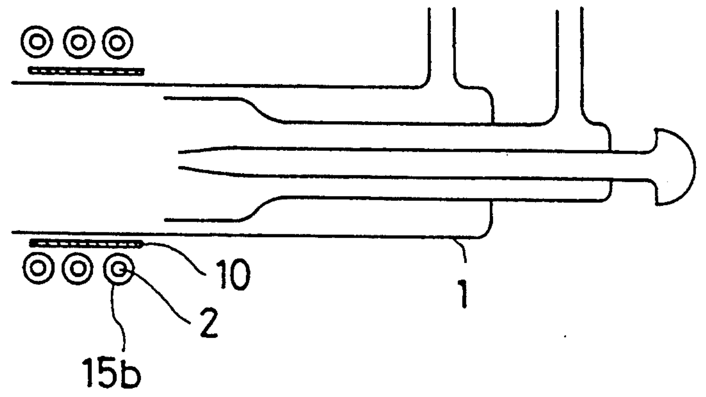
FIG. 4*b* is sectional view showing an arrangement of an insulating member according to another embodiment of the invention.

Insulation members 15*b* shown in FIG. 4*b* are provided as an insulation coating (for example, alumina coating)or as part of an insulation coating in an embodiment where the high-frequency coil 2 itself may be provided with such a coating.

Figure 4C:
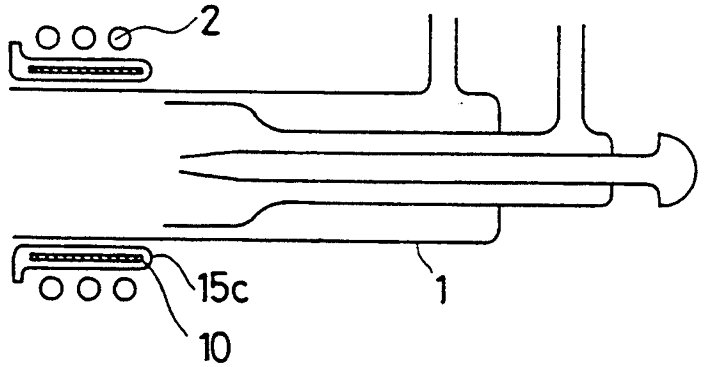
FIG. 4*c* is sectional view showing an arrangement of an insulating member according to a further embodiment of the invention.

FIG. 4*c* shows an embodiment where shield member 10 is sealed into an insulation member 15*c* (for example, quartz glass). According to the embodiment in FIG. 4*c*, since shield member 10 is not in direct contact with the atmosphere, the heat resistance and the corrosion resistance properties can be reduced even if the shield member 10 is made of copper or aluminum.

According to the invention, if becomes possible to control the plasma potential of an ICP. Therefore, even if the introduction of the sample into the ICP is achieved by any methods, an ICP-MS according to the invention becomes capable of performing the analysis by controlling interfering ions and sensitivity in an optimum manner.

This application relates to subject matter disclosed in Japanese Application number 4-93032, filed on Apr. 13, 1992, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. An inductively coupled plasma mass spectrometric device, for identification and measurement of impurity elements in a sample solution using an inductively coupled plasma, comprising: a plasma torch for generating the inductively coupled plasma; a high-frequency coil surrounding said torch for generating a high frequency electromagnetic field to maintain the inductive coupling plasma; a gas control unit connected for supplying plasma-producing gas to said plasma torch; a high-frequency power source coupled to said coil for applying high-frequency electric power to said coil; a matching circuit for electrically matching said high-frequency power source to the inductively coupled plasma; an analysis tube disposed for detecting an impurity element ionized by the inductively coupled plasma after mass separation has been performed by introduction of the ionized impurity element into a vacuum; a connection point at circuit ground potential; a shield plate made of metal interposed between said plasma torch and said high-frequency coil, a variable capacitor having first and second terminals, said first terminal being conductively connected to said shield plate; means for connecting said second terminal of said variable capacitor to said connection point; and means for maintaining said shield plate out of contact with said coil to enable control of the plasma potential of the inductively coupled plasma.

2. An inductively coupled plasma mass spectrometric device as claimed in claim 1, wherein said means for maintaining said shield plate out of contact comprise a member of electrical insulation material disposed between said high-frequency coil and said shield plate for preventing a contact therebetween.

3. An inductively coupled plasma mass spectrometric device as claimed in claim 2 wherein said member of electrical insulation material is in the form of a tube.

4. An inductively coupled plasma mass spectrometric device as claimed in claim 2, wherein said member of electrical insulation material is constituted by a coating film on said high-frequency coil.

5. An inductively coupled plasma mass spectrometric device as claimed in claim 2, wherein said shield plate is surrounded by said member of electrical insulation material.

* * * * *